United States Patent
Wei

(10) Patent No.: US 10,156,776 B1
(45) Date of Patent: Dec. 18, 2018

(54) STABILIZER FOR VIDEO CAMERA

(71) Applicant: Chengyun Wei, Guangxi (CN)

(72) Inventor: Chengyun Wei, Guangxi (CN)

( * ) Notice: Subject to any disclaimer, the term of this patent is extended or adjusted under 35 U.S.C. 154(b) by 9 days.

(21) Appl. No.: 15/701,436

(22) Filed: Sep. 11, 2017

(30) Foreign Application Priority Data

Jun. 15, 2017  (CN) .......................... 2017 1 0450897

(51) Int. Cl.
*F16M 11/04* (2006.01)
*G03B 17/56* (2006.01)

(52) U.S. Cl.
CPC ......... *G03B 17/561* (2013.01); *F16M 11/045* (2013.01); *F16M 11/046* (2013.01); *F16M 11/048* (2013.01)

(58) Field of Classification Search
CPC ....... G03B 17/561; F16M 13/00; H04N 5/232
See application file for complete search history.

(56) References Cited

U.S. PATENT DOCUMENTS

2016/0305602 A1* 10/2016 Carthey ............... F16M 11/046

FOREIGN PATENT DOCUMENTS

| CN | 201413446 Y | 2/2010 |
|---|---|---|
| CN | 102393596 B | 9/2013 |
| CN | 204272274 U | 4/2015 |
| CN | 104838312 A | 8/2015 |

* cited by examiner

*Primary Examiner* — Noam Reisner

(57) ABSTRACT

The present invention provides a stabilizer for video camera, the stabilizer has a mounting stage holding a video camera and a three-dimensional adjusting device. The three-dimensional adjusting device comprises a first transverse movement assembly, a second transverse movement assembly and a vertical movement assembly, the first transverse movement assembly comprises a first motor and a first connecting arm piece, the second transverse movement assembly comprises a second motor and a second connecting arm piece, the vertical movement assembly comprises a third motor and a third connecting arm piece, the mounting stage being connected to the third connecting arm piece. Each of said connecting arm pieces is provided with a guide rail, and each of said motors is provided with a guide slot that matches with the corresponding guide rail.

9 Claims, 3 Drawing Sheets

STABILIZER FOR VIDEO CAMERA

CROSS-REFERENCE TO PRIOR APPLICATION

This application claims the benefit of Chinese Patent Application No. 201710450897.1 filed on Jun. 15, 2017, the contents of which are incorporated herein by reference.

TECHNICAL FIELD

The present invention relates to a stabilizer for a video camera.

BACKGROUND OF THE INVENTION

Stabilizers for video camera is used for a supporting worktable that is for setting up video camera and video camera is held by the stabilizer. Video camera lens could be adjusted through adjusting the stabilizer so as to obtain a proper shooting for certain objects.

Current technology has disclosed several video camera stabilizers. CN patent application No. 201110295102.7 disclosed a stabilizer for a video camera. An upper arm of the stabilizer consists of one stabilizing spring and two square light-weighted aluminum alloy plates, and a lower arm of the stabilizer consists of two springs and three square light-weighted aluminum alloy plates. The upper ends of the two square light-weighted aluminum alloy plates of the upper arm are movably connected with a connecting rod below a holder respectively, and the other ends are movably connected with the upper ends of the three square light-weighted aluminum alloy plates of the lower arm through an connecting plate. The lower ends of the three square light-weighted aluminum alloy plates of the lower arm are movably connected with a universal member, and a stabilizing spring is connected between the connecting rod below the holder and the connecting plates. Two stabilizing springs are connected between the connecting plates and the universal member so as to form a double-arm stabilizing structure.

CN patent application No. 201380061469.X disclosed a camera stabilizer, which has a camera mount for attaching and positioning a camera, a universal joint disposed below the camera mount and positioned at or near the centre of gravity and a balancing arm.

CN patent application No. 201420868292.6 disclosed a video camera stabilizer, which comprises a microcontroller, an MEMS gyroscope chip and a video camera deflection module, wherein the microcontroller is connected with the MEMS gyroscope chip and the video camera deflection module; the MEMS gyroscope chip is fixed on a video camera and used for acquiring deflection angle data of the video camera, and the microcontroller sends a rotation instruction to a steering engine according to the data acquired by the MEMS gyroscope chip; and the video camera is fixed on the video camera deflection module, and the video camera deflection module is used for driving rotations of the video camera.

CN patent application No. 200920044348.5 disclosed a camera stabilizer, comprising a holder which is connected with a handle through a universal ball head. The camera stabilizer is characterized in that the holder consists of a front-back adjusting device, a left-right adjusting device, an upper flat plate, a middle flat plate and a lower flat plate. The upper flat plate is connected with a camera; the lower flat plate is connected with a counterweight bracket; the front-back adjusting device is arranged between the upper flat plate and the middle flat plate; and the left-right adjusting device is arranged between the middle flat plate and the lower flat plate, wherein the front-back adjusting device comprises racks and dovetail guide rails, pinions and guide slots, the racks and the dovetail guide rails are parallel arranged between the upper flat plate and the middle flat plate; the pinions drive the racks; and the guide slots are matched with the dovetail guide rails. The left-right adjusting device comprises screw rods and screw rod seats or racks, wherein the screw rods are arranged between the middle flat plate and the lower flat plate, and the screw rod seats or the racks are driven by the screw thread of the screw rods and displace along the axial direction of the screw rods. The dovetail guide rails in the front-back adjusting device are arranged at 90 degrees with the screw rods in the left-right adjusting device.

The shortcomings of above-mentioned technology are that three axes of these stabilizers are not adjustable, the stabilizing spot of these stabilizers for stabilizing video cameras (ie., mounting position or mounting spot of the video camera) is not adjustable either. Therefore, these stabilizers are able to suitably stabilize limited variety of video cameras.

SUMMARY OF THE INVENTION

The present invention aims at providing a stabilizer for video camera to overcome the above-mentioned shortcomings. The relative position of the three axes of the stabilizer and the mounting spot of the video camera are adjustable.

In order to realize the above-mentioned aim, the present invention provides a stabilizer for video camera, the stabilizer comprises: a mounting stage holding a video camera; and a three-dimensional adjusting device, the three-dimensional adjusting device comprising a first transverse movement assembly, a second transverse movement assembly and a vertical movement assembly, the first transverse movement assembly comprising a first motor and a first connecting arm piece, the second transverse movement assembly comprising a second motor and a second connecting arm piece, the vertical movement assembly comprising a third motor and a third connecting arm piece, the mounting stage being connected to the third connecting arm piece; wherein the third connecting arm piece is provided with a third guide rail, the third motor is provided with a third guide slot that matches with the third guide rail, the third motor is mounted to the second connecting arm piece; the second connecting arm piece is provided with a second guide rail, the second motor is provided with a second guide slot that matches with the second guide rail, the second motor is mounted to the first connecting arm piece; the first connecting arm piece is provided with a first guide rail, the first motor is provided with a first guide slot that matches with the first guide rail.

In the present invention, the mounting stage is located in front of the second motor. The third motor is located on a right side of the mounting stage. The first motor is located under the mounting stage.

In the present invention, the first guide rail, the second guide rail and the third guide rail are all 45-degree dovetail guide rails that extend outward. The first guide slot, the second guide slot and the third guide slot are all long dovetail slots.

In the present invention, the first connecting arm piece makes forward and backward movement relative to the first motor; the second connecting arm piece makes left and right movement relative to the second motor; and the third connecting arm piece makes upward and downward movement relative to the third motor.

In the present invention, each of said guide slots is provided on a shell wall of its corresponding motor.

The stabilizer of the present invention is able to adjust the relative position of its three axes and the mounting position of a video camera, which enables the stabilizer of the present invention to match with various video cameras. The stabilizer of the present invention is simply structured and can accurately fix a video camera.

In some embodiments of the present invention, each connecting arm piece is provided with a damping assembly. The damping assembly comprises a locking piece. The locking piece comprises a fixing element, a spring and a locking stud. The locking piece is provided on its corresponding guide slot and situated in a notch of a shell wall of a corresponding motor. The notch is provided with a protective cover to cover and protect the notch. When a connecting arm piece hits the required spot, the connecting arm piece is able to be locked via screwing tight the locking stud to lock teeth of the guide rail of the connecting arm piece.

In some embodiments of the present invention, the mounting stage further comprises a first slider, a second slider and a third slider. The second slider is situated beneath the first slider, the third slider is situated beneath the second slider. The third slider is connected to the third connecting arm piece. The first slider makes forward and backward movement relative to the second slider, the second slider makes left and right movement relative to the third slider. Two first slide rails are provided at a bottom of the first slider, and two first slideways that match with the first slide rails are provided on a top of the second slider. The two first slide rails are distributed on two lateral sides of the first slider.

In some embodiments of the present invention, two second slideways are provided at a bottom of the second slider and two second slide rails that match with the second slideways are provided on a top of the third slider. The second slideway and the first slideway are perpendicular to each other. The two second slide rails are distributed on two lateral sides of the third slider.

In some embodiments of the present invention, the first slide rail and the second slide rail are both dovetail slide rails that extend outward at 45 degrees. The first slideway and the second slideway are both a strip of dovetail slideway.

In some embodiments of the present invention, the mounting stage further comprises a first retaining assembly that is configured for locking the first slider, and a second retaining assembly that is configured for locking the third slider.

In some embodiments of the present invention, the first retaining assembly is provided on the second slider, and the second retaining assembly is provided beneath the second slider.

In some embodiments of the present invention, the first retaining assembly comprises a first locking segment and a first locking bolt. The first locking segment and the first locking bolt are connected via screw. The second retaining assembly comprises a second locking segment and a second locking bolt. The second locking segment and the second locking bolt are connected via screw.

In some embodiments of the present invention, the mounting stage further comprises a fixing assembly that is configured for fixing a video camera. The fixing assembly is provided on the first slider.

In some embodiments of the present invention, the fixing assembly comprises an array of ¼-inch fixing threaded holes and a long ¼-inch fixing stud. The fixing stud is threaded through the fixing threaded hole to fix the video camera. The fixed threaded holes are provided at a center of the first slider. The first slider is provided with a skid-proof sheet.

In some embodiments of the present invention, the first slider further comprises a support frame used for supporting a video camera lens, which is located at a front end of the first slider and adjustable to match various video cameras.

In some embodiments of the present invention, lateral side surfaces of the first guide rail, the second guide rail and the third guide rail are provided with teeth.

In some embodiments of the present invention, the stabilizer further comprises a handgrip, which is connected to a lower end of the first motor through a locking ring. The handgrip is provided with a keyboard and a key. The handgrip is a hollow cylinder that is able to hold a battery inside.

In some embodiments of the present invention, the handgrip is a single hand-held grip or a grip held by both hands. The handgrip could be switched to single hand-held grip by loosening the locking ring.

The operation method of the stabilizer of the present invention is set out as follows: placing a video camera on the first slider, adjusting the positions of the first slider, the second slider and the third slider to adjust the video camera to a proper position, fixing the video camera, and manipulating the three-dimensional device to adjust the video camera to the required position for shooting.

The stabilizer of the present invention possesses the following benefits as compared to other existing technologies: the stabilizer of the present invention is able to adjust the relative position of its three axes and the mounting position of a video camera, which enables the stabilizer of the present invention to match with various video cameras. The stabilizer of the present invention is simply structured and can accurately fix a video camera.

DETAILED DESCRIPTION OF ILLUSTRATED EMBODIMENTS

Embodiment 1

Figure 1:
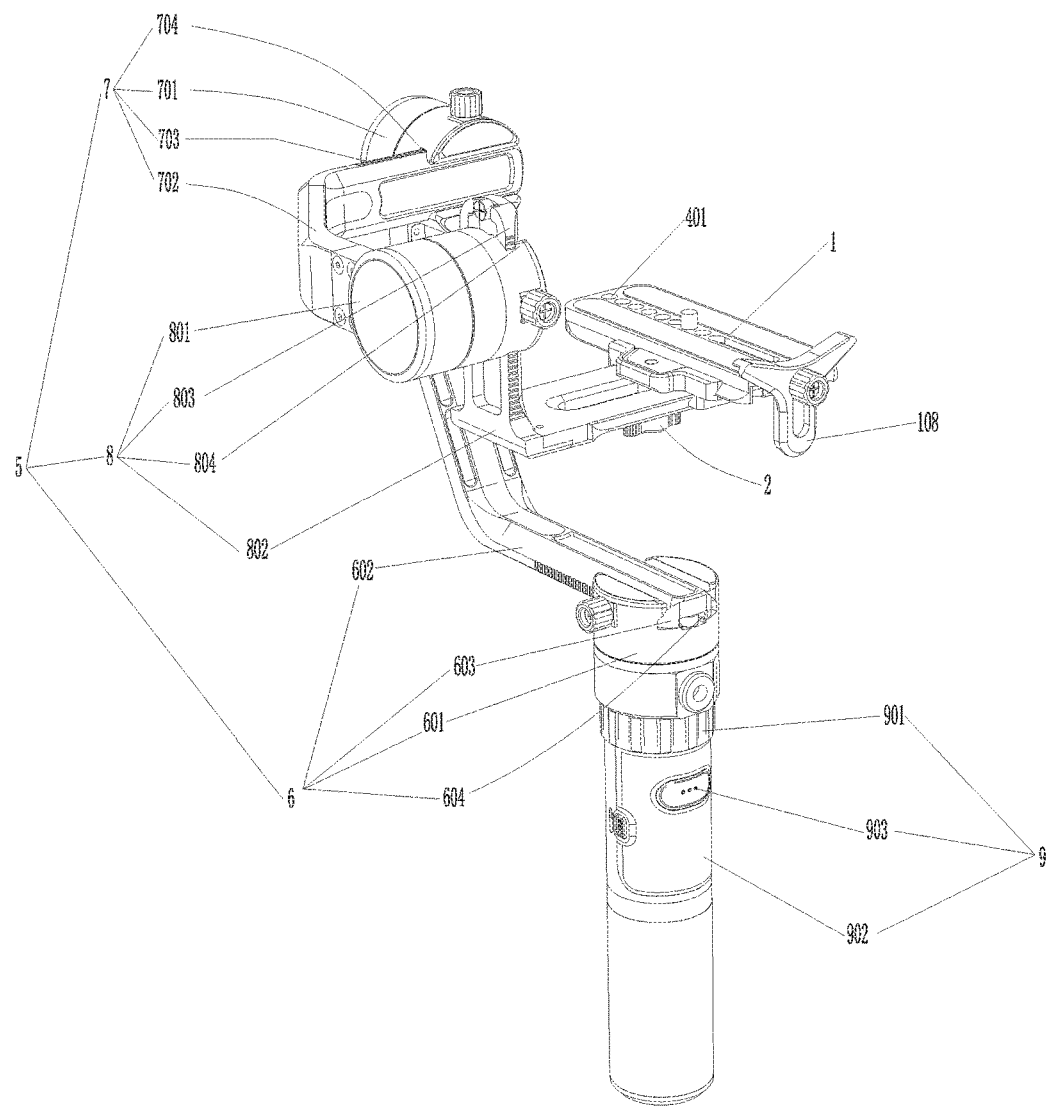
FIG. 1 is a schematic view of a stabilizer for video camera according to Embodiment 1 of the present invention.
Figure 2:
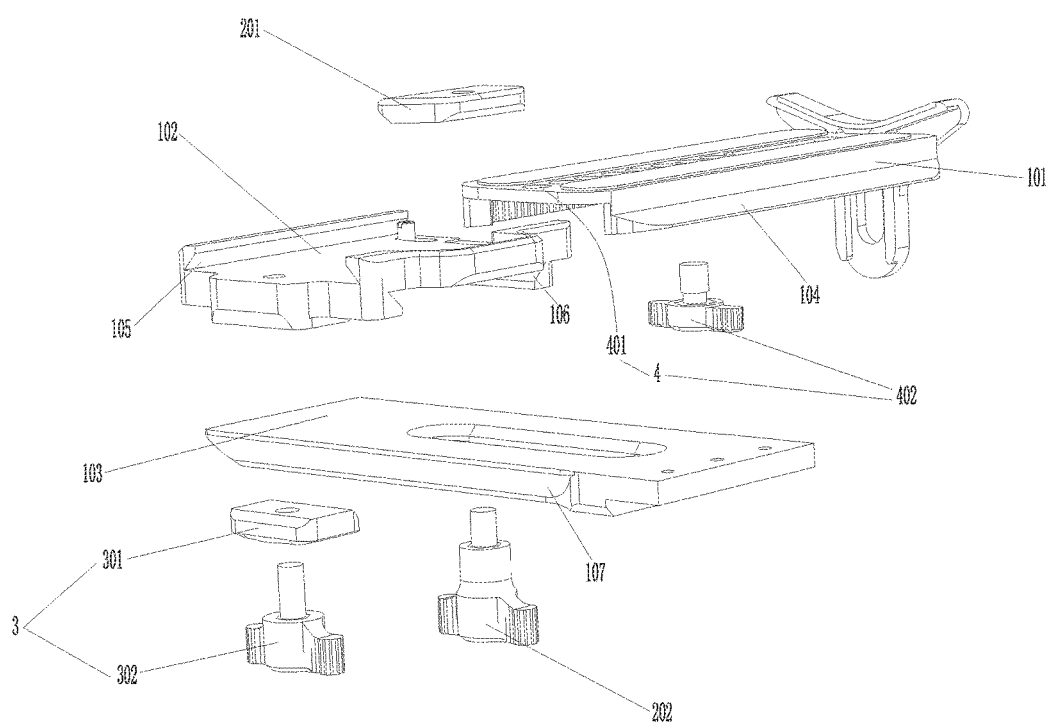
FIG. 2 is a schematic view of a mounting stage according to Embodiment 1 of the present invention.
Figure 3:
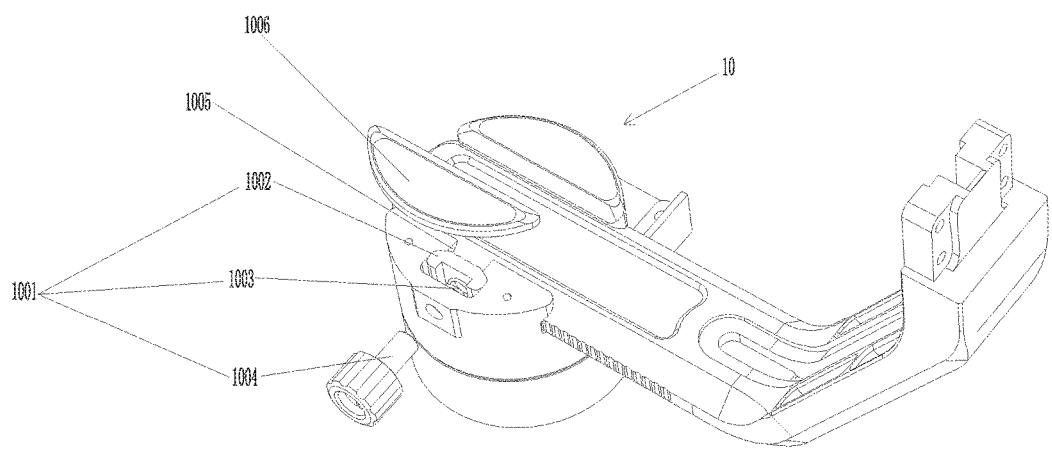
FIG. 3 is a schematic view of a damping mechanism according to Embodiment 1 of the present invention.

Embodiment 1 provides a stabilizer for video camera, as shown in FIGS. 1-3, which comprises a mounting stage 1, a first retaining assembly 2, a second retaining assembly 3, a fixing assembly 4, a 3-dimensional adjusting device 5, a first transverse movement assembly 6, a second transverse movement assembly 7, a vertical movement assembly 8, a handgrip 9 and a damping assembly 10.

Referring to FIGS. 1-2, the mounting stage 1 is configured for holding a video camera and comprises a first slider 101, a second slider 102, a third slider 103, the first retaining assembly 2, the second retaining assembly 3 and the fixing assembly 4. The second slider 102 is situated beneath the first slider 101, the third slider 103 is situated beneath the second slider 102. The first slider 101 makes forward and backward movement relative to the second slider 102, the second slider 102 makes left and right movement relative to the third slider 103.

Two first slide rails 104 are provided at a bottom of the first slider 101, two first slideways 105 that match with the first slide rails 104 are provided on a top of the second slider 102. The two first slide rails 104 are distributed on two lateral sides of the first slider 101. Two second slideways 106 are provided at a bottom of the second slider 102, two second slide rails 107 that match with the second slideways 106 are provided on a top of the third slider 103. The second slideway 106 and the first slideway 105 are perpendicular to each other. The two second slide rails 107 are distributed on two lateral sides of the third slider 103. The first slide rail 104 and the second slide rail 107 are both dovetail slide rails that extend outward at 45 degrees. The first slideway 105 and the second slideway 106 are both a strip of dovetail slideway. The first slider 101 comprises a support frame 108, which is located at a front end of the first slider 101 and used for supporting a video camera lens.

The first retaining assembly 2 is configured for locking the first slider 101. The first retaining assembly 2 is provided on the second slider 102 and comprises a first locking segment 201 and a first locking bolt 202. The first locking segment 201 and the first locking bolt 202 are connected via screw.

The second retaining assembly 3 is configured for locking the third slider 103. The second retaining assembly 3 is provided beneath the second slider 102 and comprises a second locking segment 301 and a second locking bolt 302. The second locking segment 301 and the second locking bolt 302 are connected via screw.

The fixing assembly 4 is configured for fixing a video camera. The fixing assembly 4 is provided on the first slider 101 and comprises an array of ¼-inch fixing threaded holes 401 and a ¼-inch fixing stud 402. The fixing stud 402 is threaded through the fixing threaded hole 401 to fix the video camera. The fixing threaded holes 401 are provided at a center of the first slider 101. The first slider 101 is provided with a skid-proof sheet (not shown in figures).

The 3-dimensional adjusting device 5 is configured for adjusting the position of the mounting stage 1 and comprises the first transverse movement assembly 6, the second transverse movement assembly 7 and the vertical movement assembly 8.

The first transverse movement assembly 6 comprises a first motor 601 and a first connecting arm piece 602. The first connecting arm piece 602 is provided with a first guide rail 603. The first motor 601 is provided with a first guide slot 604 that matches with the first guide rails 603. The first motor 601 is located under the mounting stage 1.

The second transverse movement assembly 7 comprises a second motor 701 and a second connecting arm piece 702. The second connecting arm piece 702 is provided with a second guide rail 703. The second motor 701 is provided with a second guide slot 704 that matches with the second guide rails 703. The mounting stage 1 is located in front of the second motor 701.

The vertical movement assembly 8 comprises a third motor 801 and a third connecting arm piece 802. The third connecting arm piece 802 is provided with a third guide rail 803. The third motor 801 is provided with a third guide slot 804 that matches with the third guide rail 803. The third motor 801 is mounted on the second connecting arm piece 702. The third slider 103 is connected to the third connecting arm piece 802. The third motor 801 is located on a right side of the mounting stage 1. The first guide rail 603, the second guide rail 703 and the third guide rail 803 are all 45-degree dovetail guide rails that extend outward. The first guide slot 604, the second guide slot 704 and the third guide slot 804 are all long dovetail slots. The first connecting arm piece 602 makes forward and backward movement relative to the first motor 601; the second connecting arm piece 702 makes left and right movement relative to the second motor 701; and the third connecting arm piece 802 makes upward and downward movement relative to the third motor 801. Each guide slot is provided on a shell wall of its corresponding motor. Lateral side surfaces of the first guide rail 603, the second guide rail 703 and the third guide rail 803 are provided with teeth.

The handgrip 9 is connected to a lower end of the first motor 601 through a locking ring 901. The handgrip 9 is provided with a keyboard 902 and a key 903. The handgrip 9 is a hollow cylinder that is able to hold a battery inside. The handgrip 9 is a single hand-held grip.

As shown in FIG. 3, each connecting arm piece is provided with the damping assembly 10. The damping assembly 10 comprises a locking piece 1001. The locking piece 1001 comprises a fixing element 1002, a spring 1003 and a locking stud 1004. The locking piece 1001 is provided on its corresponding guide slot and situated in a notch 1005 of a shell wall of a corresponding motor. The notch 1005 is provided with a protective cover 1006 to cover and protect the notch 1005. When a connecting arm piece hits the required spot, the connecting arm piece is able to be locked via screwing tight the locking stud 1004 to lock the teeth.

Embodiment 2

The distinction between embodiment 2 and embodiment 1 is that the handgrip in embodiment 2 is held in both hands and could be switched to single hand-held grip by loosening the locking ring 901.

The above-mentioned embodiments are the preferred embodiments of the present invention. Variations and modifications are allowed within the scope of the invention. Those skilled in the art will appreciate that the features described above can be combined in various ways to form multiple variations of the invention. As a result, such variations fall within the scope of the protection to the present invention.

What is claimed is:

1. A stabilizer for video camera, characterized in that the stabilizer comprises:
    a mounting stage holding a video camera; and
    a three-dimensional adjusting device, the three-dimensional adjusting device comprising a first transverse movement assembly, a second transverse movement assembly and a vertical movement assembly, the first transverse movement assembly comprising a first motor and a first connecting arm piece, the second transverse movement assembly comprising a second motor and a second connecting arm piece, the vertical movement assembly comprising a third motor and a third connecting arm piece, the mounting stage being connected to the third connecting arm piece;
    wherein the third connecting arm piece is provided with a third guide rail, the third motor is provided with a third guide slot that matches with the third guide rail, the third motor is mounted to the second connecting arm piece; the second connecting arm piece is provided with a second guide rail, the second motor is provided with a second guide slot that matches with the second guide rail, the second motor is mounted to the first connecting arm piece; the first connecting arm piece is provided with a first guide rail, the first motor is provided with a first guide slot that matches with the first guide rail, wherein each of said connecting arm pieces is provided with a damping assembly, the damping assembly comprises a locking piece; the locking piece comprises a fixing element, a spring and a locking stud; the locking piece is provided on its corresponding guide slot and situated in a notch of a shell wall of a corresponding motor; and the notch is provided with a protective cover to cover and protect the notch.

2. The stabilizer for video camera according to claim 1, characterized in that the mounting stage further comprises a first slider, a second slider and a third slider; the second slider is situated beneath the first slider, the third slider is situated beneath the second slider; the third slider is connected to the third connecting arm piece; a first slide rail is provided at a bottom of the first slider, and a first slideway that matches with the first slide rail is provided on a top of the second slider.

3. The stabilizer for video camera according to claim 2, characterized in that a second slideway is provided at a bottom of the second slider, and a second slide rail that matches with the second slideway is provided on a top of the third slider; the second slideway and the first slideway are perpendicular to each other.

4. The stabilizer for video camera according to claim 3, characterized in that the mounting stage further comprises a first retaining assembly that is configured for locking the first slider, and a second retaining assembly that is configured for locking the third slider.

5. The stabilizer for video camera according to claim 4, characterized in that the first retaining assembly is provided on the second slider, and the second retaining assembly is provided beneath the second slider.

6. The stabilizer for video camera according to claim 5, characterized in that the mounting stage further comprises a fixing assembly that is configured for fixing the video camera; the fixing assembly is provided on the first slider.

7. The stabilizer for video camera according to claim 6, characterized in that the first slider further comprises a support frame used for supporting a video camera lens.

8. The stabilizer for video camera according to claim 1, characterized in that lateral side surfaces of the first guide rail, the second guide rail and the third guide rail are provided with teeth.

9. The stabilizer for video camera according to claim 1, characterized in that the stabilizer further comprises a handgrip, which is connected to a lower end of the first motor.

* * * * *